Patented Aug. 31, 1926.

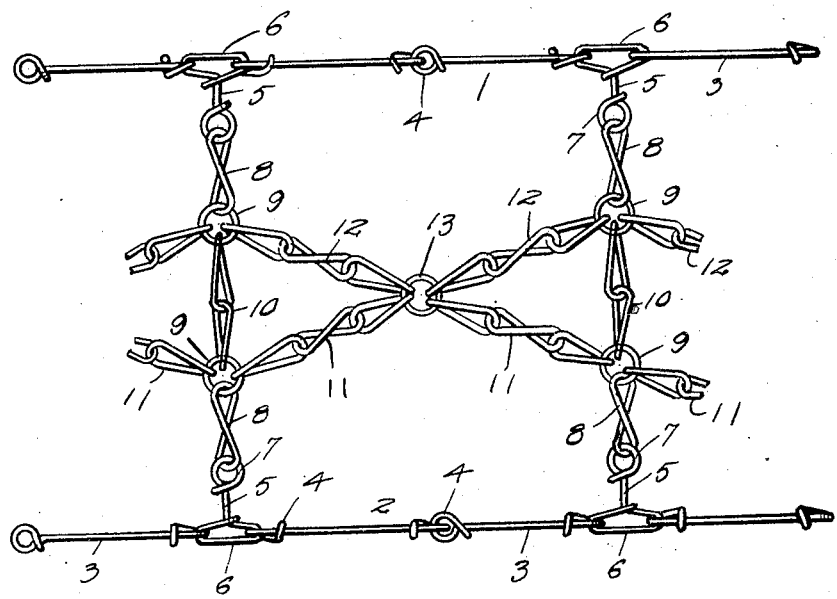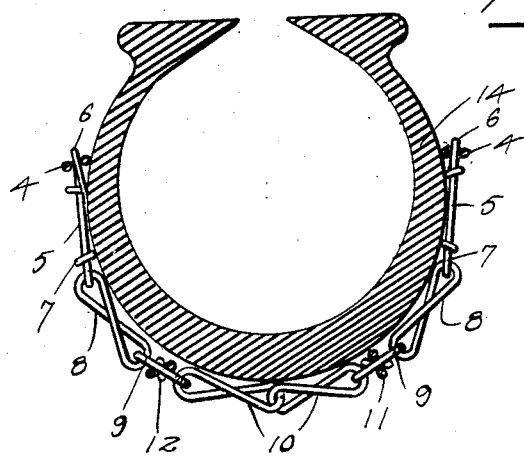

1,598,271

UNITED STATES PATENT OFFICE.

JOSEPH C. EDWARDS AND CARL T. GRAVES, OF HALLSVILLE, MISSOURI.

TIRE CHAIN.

Application filed January 11, 1923. Serial No. 612,049.

This invention relates to a tire chain and has for its principal object to provide a non-skid chain which is adapted to be applied to the tires of automobiles or the like and when in proper position will prevent the slipping of the same upon the tire casing and furthermore will prevent the skidding of the wheels.

Another important object of the invention is to provide a tire chain of the above mentioned character, which is of such a construction so as to enable the same to be used indefinitely and will not break or become interlinked or entangled when not in use.

Another important object of the invention is to provide a tire chain of the above mentioned character, which can be easily and quickly applied to the tires of the vehicle without the necessity of employing the use of special tools and furthermore is of such a construction as to entirely prevent the tire casing from coming in contact with the ground when used.

A still further object of the invention is to provide a tire chain of the above mentioned character, which is simple in construction, inexpensive, strong, durable and further well adapted for the purpose for which it is designated.

In the accompanying drawing forming a part of this specification and in which like numerals designate like parts throughout the same:—

Figure 1 is a plan view of a portion of our tire chain.

Figure 2 is a cross sectional view showing the tire chain in position upon a tire.

In the drawings wherein for the purpose of illustration is shown the preferred embodiment of our invention, the numerals 1 and 2 designate tire chains which are arranged on opposite sides of the tire casing 14 and extend circumferentially around the same and in parallel relation with each other. Each of the tire chains 1 and 2 respectively comprises a plurality of rigid straight rods 3 and the respective ends of these rigid straight rods 3 are provided with looped portions 4. One end of the rod 3 and the looped portion 4 formed thereon are interlinked with each other and the opposite ends which are also looped are adapted to be connected to each other by means of the links 5. The links 5 are provided with elongated loop portions 6 at their outer ends for the purpose of receiving the looped ends 4 of the rigid rods 3 and when in this position the opposite ends of the links 5 extend inwardly from the side chains 1 and 2 and are also provided with looped portions such as shown at 7 in the drawings. The looped inner ends 7 of the links 5 are adapted to be connected to the links 8 and the opposite end of the links 8 are in turn connected or looped about a portion of suitable rings 9. The rings 9 are connected to each other by the cross chains and thereby form a continuous connection extending across the parallel side chains 1 and 2. As further noted in the drawings these cross chains 10 are arranged in connection with the links 5 and 8 and the side chains 1 and 2 in parallel spaced relation.

Arranged between and adjacent the transversely extending chains 10 and the parallel side chains 1 and 2 are the diagonally extending chains 11 and 12 respectively. These diagonally extending chains 11 and 12 are connected at one end to the rings 9 and at the other end are connected to a ring 13 located centrally between the cross chains 10 and the parallel side chains 1 and 2 respectively.

By forming the parallel side chains 1 and 2 of rigid straight rods it will be seen that the same will not become easily entangled or interlinked when not in use and furthermore will be of such a construction as to prevent the collection of mud or the like from adhering to the rods while the same are in use upon a tire and furthermore wherein the tire has come in contact with soft ground. The arrangement of the cross chains and diagonally extending chains will prevent any lateral slipping or skidding of the wheel and will furthermore firmly grip the ground to insure the forward movement of the wheel as it rotates and will prevent accidental turning of the vehicle when attempting to move forwardly on a rainy day or when in contact with a muddy surface.

The chains 10 and the links 5 and 8 connected thereto will furthermore tend to hold the side chains 1 and 2 circumferentially in proper position upon the tire 14 and it will be further seen that the tire 14 will not be able to come in contact with the surface of the ground when the chain is applied thereon and prevent the proper functioning of the tire chains.

The tire chain may have its respective sides 1 and 2 provided with suitable fastening means at the open ends thereof for the purpose of permitting the same to be securely held in proper position upon the tire casing and we do not wish to confine ourselves to the manner in which the same is secured thereon as any well known type of means may be employed. It is not deemed necessary to show this feature and it is to be understood that the fastening means will be so arranged in connection with the tire chain to firmly hold the tire chain in proper position upon the tire when in use.

From the foregoing description of the construction of our improved apparatus, it will be seen that we have provided a simple, inexpensive and efficient means for carrying out the objects of the invention, and while we have particularly described the elements best adapted to perform the functions set forth, it is obvious that various changes in form, proportion and in the minor details of construction may be resorted to without departing from the spirit or sacrificing any of the principles of the invention.

What we claim as new and desire to secure by Letters Patent is:—

A non-skid structure comprising side chains, each of the said side chains including links, each of said links being formed from a single length of wire, each link having a straight intermediate stem portion, the end portion at one end of the stem being formed into an approximately elliptical loop, the end portion at the opposite end of the stem being formed into an approximately circular loop, both of said loops lying in the same plane and in the plane of the intermediate stem portion, the extremities of the loops being carried across and around the stem portion, one in the vicinity of each end thereof.

In testimony whereof we affix our signatures.

JOSEPH C. EDWARDS.
CARL T. GRAVES.